(12) United States Patent
Jiang et al.

(10) Patent No.: US 12,537,644 B2
(45) Date of Patent: Jan. 27, 2026

(54) METHODS AND DEVICES FOR ENHANCEMENT ON SOUNDING REFERENCE SIGNAL (SRS) TRANSMISSION SIGNALING

(71) Applicant: ZTE Corporation, Shenzhen (CN)

(72) Inventors: Chuangxin Jiang, Shenzhen (CN); Hao Wu, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 345 days.

(21) Appl. No.: 17/847,415

(22) Filed: Jun. 23, 2022

(65) Prior Publication Data
US 2022/0329370 A1    Oct. 13, 2022

Related U.S. Application Data

(63) Continuation of application No. PCT/CN2020/070165, filed on Jan. 3, 2020.

(51) Int. Cl.
*H04L 5/00* (2006.01)
*H04W 52/04* (2009.01)

(52) U.S. Cl.
CPC ............. *H04L 5/005* (2013.01); *H04W 52/04* (2013.01)

(58) Field of Classification Search
CPC ..... H04L 5/005; H04L 5/0023; H04L 5/0048; H04L 5/0051; H04L 25/0226;
(Continued)

(56) References Cited

U.S. PATENT DOCUMENTS

2020/0036492 A1\*  1/2020  Sun ..................... H04L 5/0048
2020/0112349 A1\*  4/2020  Yang .................... H04B 7/0404
(Continued)

FOREIGN PATENT DOCUMENTS

CN    109923828 A    6/2019
CN    110167168 A    8/2019
(Continued)

OTHER PUBLICATIONS

3GPP TSG RAN WG1 Meeting #92bis; R1-1803641; Source: Huawei, HiSilicon; Title: Remaining details of UL power control design ; Sanya, China, Apr. 16-20, 2018. (Year: 2018).\*
(Continued)

*Primary Examiner* — Mohammed S Chowdhury
(74) *Attorney, Agent, or Firm* — Crowell & Moring LLP

(57) ABSTRACT

Method, systems and devices for wireless communication. The method includes performing sounding reference signal (SRS) transmission between a user equipment and a network base station by obtaining a first transmit power of a first SRS resource and determining a second transmit power of a second SRS resource based on the first transmit power of the first SRS resource of a same SRS resource set; transmitting N sets of parameters corresponding to a SRS resource set between the network base station and the user equipment; or transmitting M sections of frequency sounding at a symbol between the user equipment and the network base station, wherein each section of the M sections comprises consecutive physical resource blocks (PRBs), M being a positive integer.

12 Claims, 18 Drawing Sheets

(58) Field of Classification Search
CPC ... H04W 52/04; H04W 52/34; H04W 52/146; H04W 72/23; H04W 52/346; H04W 52/367; H04W 52/325; H04W 72/04; H04B 7/0602; H04B 7/0695; H04B 7/0404; H04B 7/0456
See application file for complete search history.

(56) References Cited

U.S. PATENT DOCUMENTS

| | | | | |
|---|---|---|---|---|
| 2020/0374814 | A1* | 11/2020 | Gong | H04L 25/0226 |
| 2021/0112498 | A1* | 4/2021 | Duan | H04L 5/0094 |
| 2021/0352596 | A1* | 11/2021 | Liu | H04W 52/146 |
| 2025/0150975 | A1* | 5/2025 | Kang | H04W 52/146 |

FOREIGN PATENT DOCUMENTS

| | | |
|---|---|---|
| CN | 110351040 A | 10/2019 |
| WO | WO2018126361 A1 | 7/2018 |
| WO | WO 2019169590 A1 | 9/2019 |
| WO | WO 2019197526 A1 | 10/2019 |

OTHER PUBLICATIONS

International Search Report and Written Opinion regarding PCT/CN2020/070165 dated Oct. 13, 2020.

Hua Wei et al., "Remaining details of UL power control design," 1-29 *3GPP TSG RAN WGJ Meeting #93 RI-1805963*, 25 May 25, 2018.

Hua Wei et al., "Remaining details of UL power control design," 1-29 *3GPP TSG RAN WGJ Meeting #92 RI-1803641*, Apr. 20, 2018.

First Chinese Office Action and English translation of the Office Action regarding Application No. 202080894474 dated Jul. 29, 2024, 18 pages.

* cited by examiner

400 ⤵

> obtaining, by the user equipment, a transmit power of a first SRS resource;
>
> 410

↓

> determining, by the user equipment, a transmit power of a second SRS resource based on the transmit power of the first SRS resource, wherein the first SRS resource and the second SRS resource belong to a same SRS resource set
>
> 420

> receiving, by the network base station, a first SRS resource with a first transmit power and a second SRS resource with a second transmit power from the user equipment, wherein the user equipment obtains the first transmit power of the first SRS resource and determines the second transmit power of the second SRS resource based on the transmit power of the first SRS resource, and the first SRS resource and the second SRS resource belong to a same SRS resource set
>
> 510

FIG. 5 determining the first transmit power of the first SRS resource as $\hat{P}$
910A determining the second transmit power of the second SRS resource as N times $\hat{P}$, wherein N is a positive integer
920A

FIG. 9A determining the first transmit power of the first SRS resource as $\hat{P}$
910B determining the second transmit power of the second SRS resource as 1/N times $\hat{P}$, wherein N is a positive integer
920B

FIG. 9B

Allocating the first transmit power of the first SRS resource equally across the first number of ports in the first SRS resource
930

FIG. 9C

Allocating the second transmit power of the second SRS resource equally across the second number of ports in the second SRS resource
940

FIG. 9D

1000 receiving, by the user equipment, N sets of parameters corresponding to a SRS resource set from a network base station
1010

FIG.10A

Receiving, by the user equipment, each set of parameters in a beam reference configured by the network base station, wherein the beam reference comprises a transmission configuration indicator (TCI) or a spatial relation configuration
1020

FIG.10B

1100 sending, by the network base station, N sets of parameters corresponding to a SRS resource set to a user equipment
1110

FIG.11A

Configuring, by the network base station, each set of parameters in a beam reference, wherein the beam reference comprises at least one of a transmission configuration indicator (TCI) or a spatial relation configuration
1120

FIG.11B transmitting, by the network base station, the TCI or the spatial relation configuration to the user equipment
1130

FIG.11C

1400 transmitting, by the user equipment, M sections of frequency sounding at a symbol to the network base station, wherein each section of the M sections comprises consecutive physical resource blocks (PRBs), M being a positive integer.
1410

FIG.14A configuring M sets of parameters corresponding to a SRS resource set or a SRS resource, where in M > 1
1420

FIG.14B calculating, by the user equipment, a set of hopping numbers corresponding to the M sections of frequency sounding

1810

METHODS AND DEVICES FOR ENHANCEMENT ON SOUNDING REFERENCE SIGNAL (SRS) TRANSMISSION SIGNALING

CROSS-REFERENCE TO RELATED APPLICATION

This application is a continuation application of PCT International Patent Application No. PCT/CN2020/070165, filed with the China National Intellectual Property Administration, PRC on Jan. 3, 2020, which is herein incorporated by reference in its entirety.

TECHNICAL FIELD

The present disclosure is directed generally to wireless communications. Particularly, the present disclosure relates to methods and devices for enhancement on sounding reference signal (SRS) transmission signaling.

BACKGROUND

Wireless communication technologies are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfil the requirements from different industries and users. A sounding reference signal (SRS) may be transmitted between a user equipment and a base station to provide a means for the network to estimate state of channels for better communication.

SUMMARY

This document relates to methods, systems, and devices for wireless communication, and more specifically, for enhancement on sounding reference signal (SRS) transmission signaling.

In one embodiment, the present disclosure describes a method for performing sounding reference signal (SRS) transmission between a user equipment and a network base station. The method includes obtaining, by the user equipment, a first transmit power of a first SRS resource; and determining, by the user equipment, a second transmit power of a second SRS resource based on the first transmit power of the first SRS resource. The first SRS resource and the second SRS resource belong to a same SRS resource set.

In one embodiment, the present disclosure describes a method for performing sounding reference signal (SRS) transmission between a user equipment and a network base station. The method includes receiving, by the network base station, a first SRS resource with a first transmit power and a second SRS resource with a second transmit power from the user equipment. The user equipment obtains the first transmit power of the first SRS resource and determines the second transmit power of the second SRS resource based on the transmit power of the first SRS resource, and the first SRS resource and the second SRS resource belong to a same SRS resource set.

In one embodiment, the present disclosure describes a method for performing sounding reference signal (SRS) transmission between a user equipment and a network base station. The method includes receiving, by the user equipment, N sets of parameters corresponding to a SRS resource set from the network base station. N is a positive integer, and each set of the N sets of parameters comprises at least one of: a bandwidth part (BWP) identification (ID), a channel state information-interference measurement (CSI-IM) resource ID (CSI-IM-ResourceId) or CSI-IM resource set ID (CSI-IM-ResourceSetID), a non-zero power (NZP) CSI-reference signal (CSI-RS) resource ID or NZP CSI-RS resource set ID, a CSI-RS resource configuration ID (CSI-ResourceConfigId), and a CSI report setting ID (CSI-ReportConfigId).

In one embodiment, the present disclosure describes a method for performing sounding reference signal (SRS) transmission between a user equipment and a network base station. The method includes sending, by the network base station, N sets of parameters corresponding to a SRS resource set to the user equipment. N is a positive integer, and each set of the N sets of parameters comprises at least one of: a bandwidth part (BWP) identification (ID), a channel state information-interference measurement (CSI-IM) resource ID (CSI-IM-ResourceId) or CSI-IM resource set ID (CSI-IM-ResourceSetID), a non-zero power (NZP) CSI-reference signal (CSI-RS) resource ID or NZP CSI-RS resource set ID, a CSI-RS resource configuration ID (CSI-ResourceConfigId), and a CSI report setting ID (CSI-ReportConfigId).

In one embodiment, the present disclosure describes a method for performing sounding reference signal (SRS) transmission between a user equipment and a network base station. The method includes transmitting, by the user equipment, M sections of frequency sounding at a symbol to the network base station. Each section of the M sections comprises consecutive physical resource blocks (PRBs), and M is a positive integer.

In one embodiment, the present disclosure describes a method for performing sounding reference signal (SRS) transmission between a user equipment and a network base station. The method includes receiving, by the network base station, M sections of frequency sounding at a symbol from the user equipment. Each section of the M sections comprises consecutive physical resource blocks (PRBs), and M is a positive integer.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 4 shows a flow diagram of a method for wireless communication.

FIG. 5 shows a flow diagram of a method for wireless communication.

FIG. 9 shows a flow diagram of a method for wireless communication.

FIG. 9A shows a flow diagram of a method for wireless communication.

FIG. 9B shows a flow diagram of a method for wireless communication.

FIG. 9C shows a flow diagram of a method for wireless communication.

FIG. 9D shows a flow diagram of a method for wireless communication.

FIG. 10A shows a flow diagram of a method for wireless communication.

FIG. 10B shows a flow diagram of a method for wireless communication.

FIG. 11A shows a flow diagram of a method for wireless communication.

FIG. 11B shows a flow diagram of a method for wireless communication.

FIG. 11C shows a flow diagram of a method for wireless communication.

FIG. 14A shows a flow diagram of a method for wireless communication.

FIG. 14B shows a flow diagram of a method for wireless communication.

DETAILED DESCRIPTION

Figure 1:
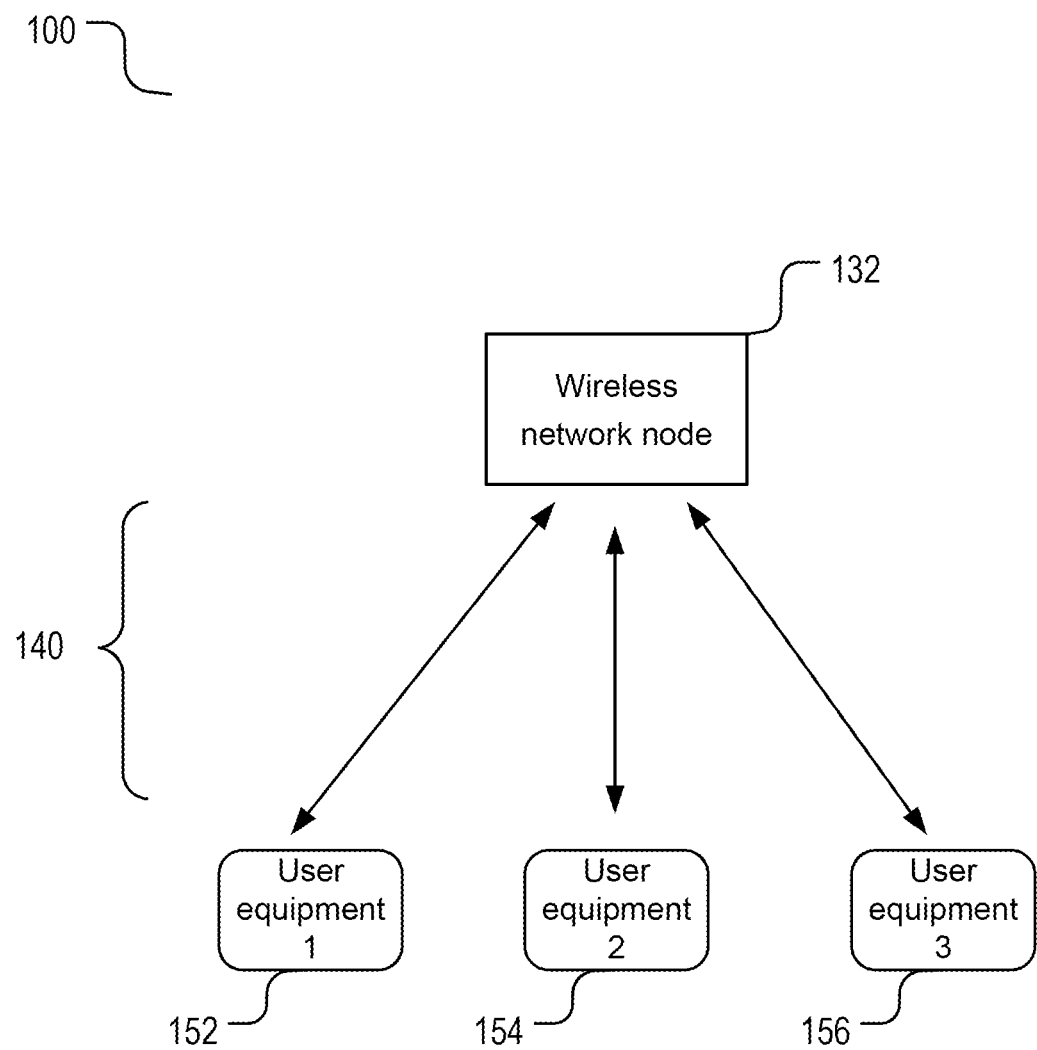
FIG. 1 shows an example of a wireless communication system include one wireless network node and one or more user equipment.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for enhancement on sounding reference signal (SRS) transmission signaling.

Sounding reference signal (SRS) transmission between a user equipment (UE) and a wireless network node may be used to obtain downlink (DL) channel state information (CSI) and/or uplink (UL) CSI, which may enable outstanding downlink and/or uplink performance. For example, for time division duplex (TDD) systems with antenna calibration, channel reciprocity may be used to measure DL CSI based on the uplink SRS measurement, and then to enable multiple input multiple output (MIMO) performance, assist DL beamforming, and/or assist DL precoding.

Uplink Sounding reference signal (SRS) may be an user-equipment specific signal and transmitted from a user equipment (UE) to a wireless network node. With potentially large number of active UEs in a cell serviced by the wireless network node as well as mobility of these large number of active UEs, SRS capacity may be an issue. Considering the transmission power of UEs is generally much lower than the transmission power of the wireless network node, UEs may be restricted on allocating transmit power to SRS recourse. A relatively low power may result in a relatively low signal to interference and noise ratio (SINR), which may lead to poor measurements of uplink CSI and/or downlink CSI. The present disclosure describes one or more embodiments to address at least one or more issues discussed above.

In one embodiment, the present disclosure addresses at least one issue with the existing methods wherein, for performing SRS transmission between a user equipment (UE) and a wireless network node, a concern of transmit power allocation for SRS resource may arise. The existing methods of allocating transmit power to SRS resource may cause unfair downlink (DL) channel state information (CSI).

In another embodiment, the present disclosure addresses at least one issue with the existing methods wherein, for performing SRS transmission between a user equipment (UE) and a wireless network node, a concern of unsymmetrical interference situation between downlink (DL) and uplink (UL) may arise. The existing methods of configuring parameters, for example, SRS precoder and/or spatial domain transmission filter, may be unsuitable for measuring downlink (DL) channel state information (CSI).

In another embodiment, the present disclosure addresses at least one issue with the existing methods wherein, for performing SRS transmission between a user equipment (UE) and a wireless network node, a concern of configuring SRS resources for frequency hopping may arise. The existing methods of restriction of SRS transmission distribution within allocated physical resource blocks (PRBs) may be inefficient for performing SRS transmission and/or measuring downlink (DL) channel state information (CSI).

FIG. 1 shows a wireless communication system 100 including a wireless network node 132 and one or more user equipment (UE) (152, 154, and 156). The wireless network node may be a base station, which may be a nodeB (NB, e.g., an eNB or gNB) in a mobile telecommunications context. Each of the UE may wirelessly communicate with the wireless network node via one or more radio channels 140. For example, a first UE 152 may wirelessly communicate with a wireless network node 132 via a channel including a plurality of radio channels during a certain period of time. Likewise, a second UE 154 and a third UE 156 may wirelessly communicate with the wireless network node 132.

Figure 2:
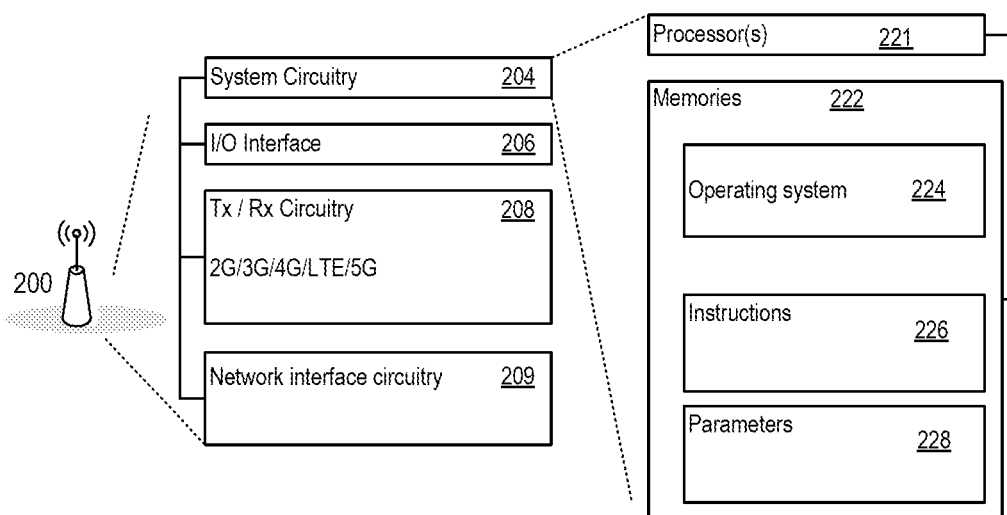
FIG. 2 shows an example of a network node.

FIG. 2 shows an example base station 200. The example base station may include radio transmitting/receiving (Tx/Rx) circuitry 208 to transmit/receive communication with UEs and/or other base stations. The base station may also include network interface circuitry 209 to communicate the base station with other base stations and/or a core network, e.g., optical or wireline interconnects, Ethernet, and/or other data transmission mediums/protocols. The base station 200 may optionally include an input/output (I/O) interface 206 to communicate with an operator or the like.

The base station may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the base station. The parameters 228 may include parameters to support execution of the instructions 226. For example, parameters may include network protocol settings, bandwidth parameters, radio frequency mapping assignments, and/or other parameters.

Figure 3:
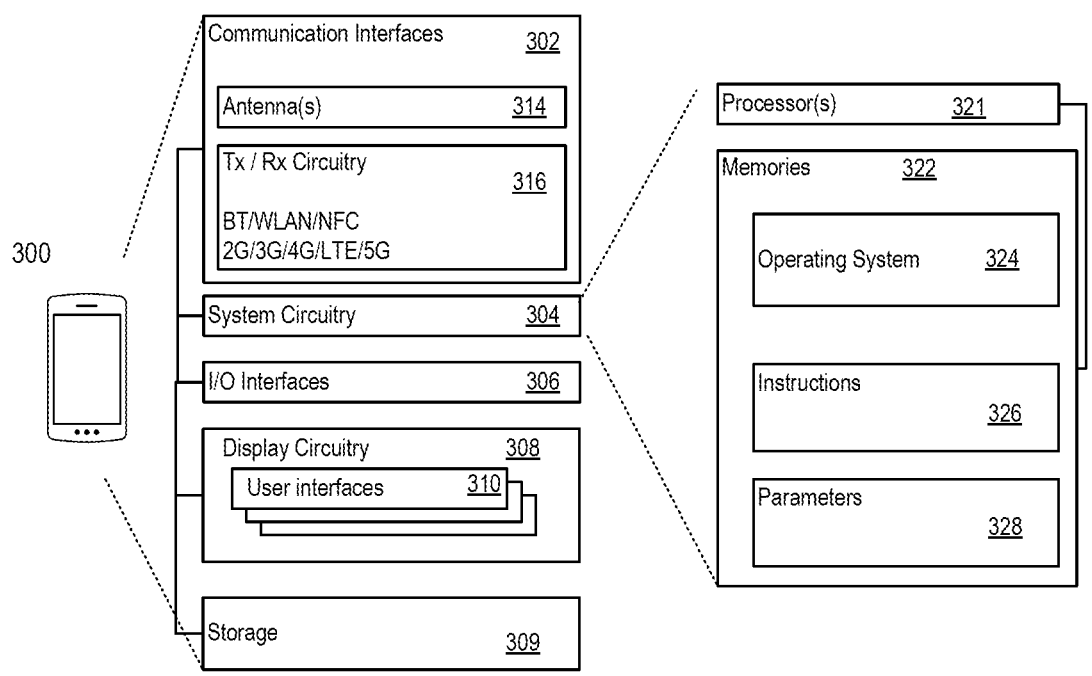
FIG. 3 shows an example of a user equipment.

FIG. 3 shows an example UE 300. The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, preamplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several below embodiments, which may be implemented, partly or totally, on the network base station and/or the user equipment described above.

Embodiment #1

The present disclosure describe embodiments of methods and devices for performing sounding reference signal (SRS) transmission between a user equipment and a network base station.

In one embodiment, referring to FIG. 4, a method 400 may include step 410: obtaining, by the user equipment, a first transmit power of a first SRS resource; and step 420: determining, by the user equipment, a second transmit power of a second SRS resource based on the first transmit power of the first SRS resource, wherein the first SRS resource and the second SRS resource belong to a same SRS resource set.

In another embodiment, referring to FIG. 5, a method 500 may include step 510: receiving, by the network base station, a first SRS resource with a first transmit power and a second SRS resource with a second transmit power from the user equipment, wherein the user equipment obtains the first transmit power of the first SRS resource and determines the second transmit power of the second SRS resource based on the transmit power of the first SRS resource, and the first SRS resource and the second SRS resource belong to a same SRS resource set.

A SRS resource set may include more than one SRS resources. Each of the more than one SRS resources may include a set of power control parameters. The set of power control parameters may include at least one of alpha, pathlossReferenceRS, p0, or srs-PowerControlAdjustmentStates. A SRS resource may be configured with multiple SRS ports, and the UE may split a transmit power $\hat{P}$ across the configured SRS ports.

In one implementation, for example but not limited to, a UE may transmit uplink signals by two transmit (Tx) antennas and may receive downlink signals by four receive (Rx) antennas. In order to achieve full downlink channel information, the UE may configure SRS antennas as 2T4R for antenna switching.

Figure 6A:
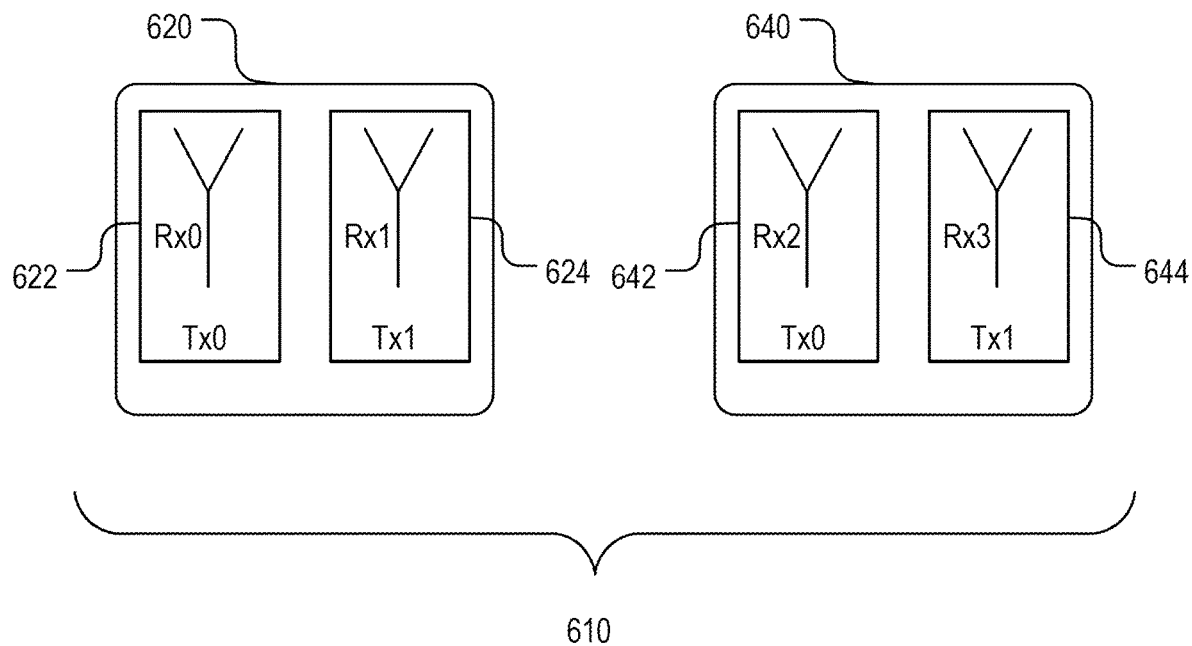
FIG. 6A shows an example for 2T4R SRS antenna configuration.

Referring to FIG. 6A, as an example for 2T4R SRS antenna configuration, the SRS resource set 610 may include a first SRS resource 620 and a second SRS resource 640. The first SRS resource 620 may include two SRS ports. The second SRS resource 640 may include two SRS ports.

The first SRS resource 620 may include a first SRS port Tx0 in 622 and a second SRS port Tx1 in 624. In 622, the first SRS port Tx0 may be associated with a first antenna port Rx0. In 624, the second SRS port Tx1 may be associated with a second antenna port Rx1.

The second SRS resource 640 may include a first SRS port Tx0 in 642 and a second SRS port Tx1 in 644. In 642, the first SRS port Tx0 may be associated with a third antenna port Rx2. In 644, the second SRS port Tx1 may be associated with a fourth antenna port Rx3.

In the existing methods, the UE may allocate equal transmit power $\hat{P}$ to each SRS resource and may also split the transmit power $\hat{P}$ equally across the configured SRS ports. That is, in the 2T4R for antenna switching in FIG. 6A, each SRS port within the SRS resource set may be configured the same transmission power.

In another implementation, a UE may have higher capability and support more Rx antennas and/or more Tx antennas. For example, but not limited to, the UE may support six Tx antennas and eight Rx antennas. For another example, in order to achieve full downlink channel information, the UE may configure SRS antennas as 4T6R for antenna switching.

Figure 6B:
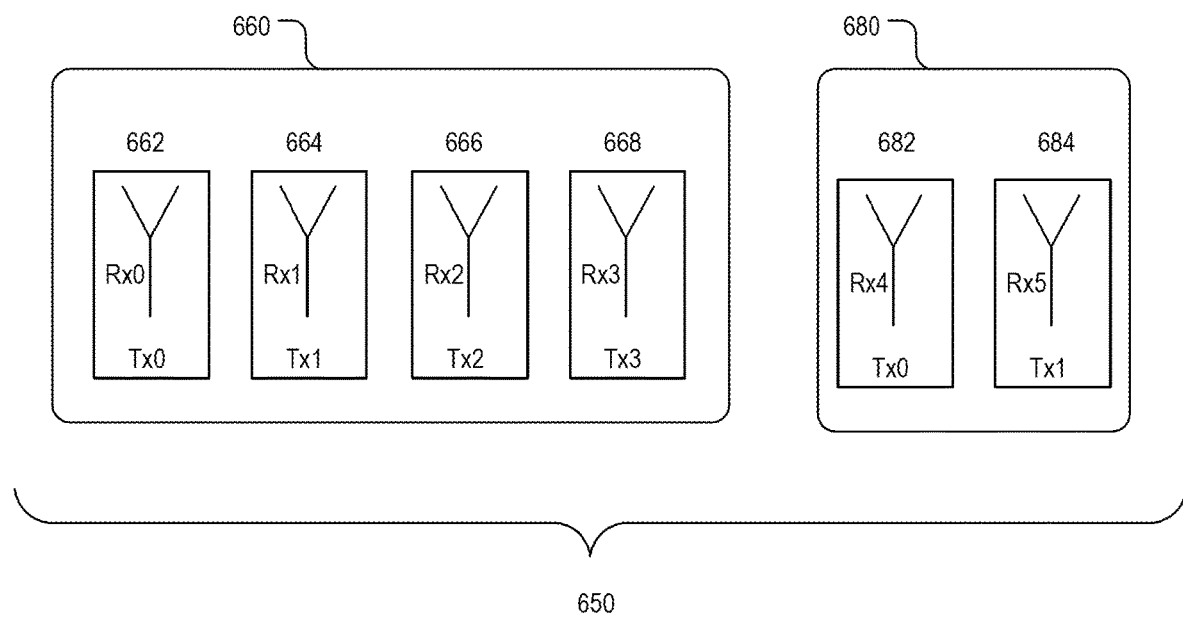
FIG. 6B shows an example for 4T6R SRS antenna configuration.

Referring to FIG. 6B, as an example for 4T6R SRS antenna configuration, a SRS resource set 650 may include a first SRS resource 660 and a second SRS resource 680. The first SRS resource 660 may include four SRS ports, and the second SRS resource 680 may include two SRS ports. In one implementation, when the UE configures SRS antennas as 4T6R, the first SRS resource and the second SRS resource may be configured to transmit in different symbols. The SRS ports of the second SRS resource 680 may be associated with different UE antenna ports compared with the SRS ports of the first SRS resource 660.

Referring to FIG. 6B, the first SRS resource 660 may include a first SRS port Tx0 in 662, a second SRS port Tx1 in 664, a third SRS port Tx2 in 666, and a fourth SRS port Tx3 in 668. In 662, the first SRS port Tx0 may be associated with a first antenna port Rx0. In 664, the second SRS port Tx1 may be associated with a second antenna port Rx1. In 666, the third SRS port Tx2 may be associated with a third antenna port Rx2. In 668, the fourth SRS port Tx3 may be associated with a fourth antenna port Rx3. The second SRS resource 680 may include a first SRS port Tx0 in 682 and a second SRS port Tx1 in 684. In 682, the first SRS port Tx0 may be associated with a fifth antenna port Rx4. In 684, the second SRS port Tx1 may be associated with a sixth antenna port Rx5.

Figure 7:
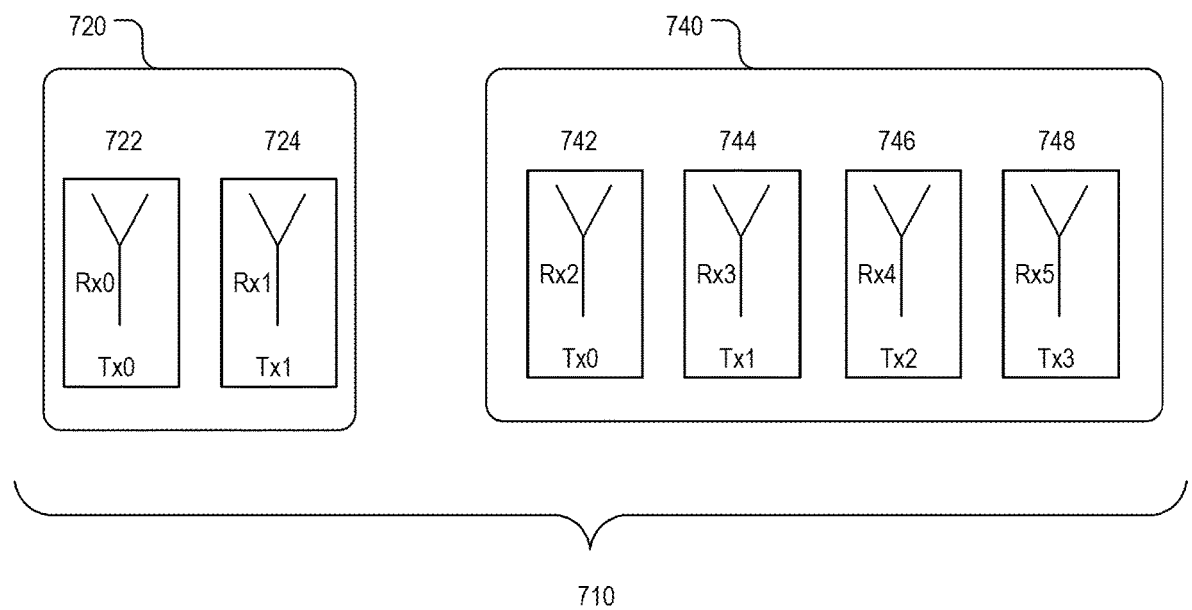
FIG. 7 shows another example for 4T6R SRS antenna configuration.

There may be different SRS antenna configurations when a UE includes 4T6R SRS antenna configuration. Referring to FIG. 7, as another example for 4T6R SRS antenna configuration, a SRS resource set 710 may include a first SRS resource 720 including two SRS ports and a second SRS resource 740 including four SRS ports. The first SRS resource 720 may include a first SRS port Tx0 in 722 and a second SRS port Tx1 in 724. The second SRS resource 740 may include a first SRS port Tx0 in 742, a second SRS port Tx1 in 744, a third SRS port Tx2 in 746, and a fourth SRS port Tx3 in 748.

For the above two examples, the SRS resources in the same SRS resource set may include different number of SRS ports or different number of antenna ports. An issue may arise when a method of allocating transmit power to the SRS resources leads unequal transmit power of each SRS port within different SRS resources in the same SRS resource set, and this issue may cause unfair measurement of DL CSI for each Rx antenna. For example, referring to FIG. 7, the first SRS resource 720 include two SRS ports and the second SRS resource 740 includes four SRS ports. In a method, when SRS power control is based on SRS resource set 710, the same linear SRS transmit power $\hat{P}$ is used for all SRS resources (720 and 740) within the same SRS resource set 710, and a transmit power of the first SRS resource is the same as a transmit power of the second SRS resource. Because the first SRS resource 720 has two ports, each port in the first SRS resource 720 has linear power of $\hat{P}/2$. Because the second SRS resource 740 has four ports, each port in the second SRS resource 740 has linear power of $\hat{P}/4$. The different power for ports in first and second SRS resources may cause unfair measurement of DL CSI for each Rx antenna.

Figure 8:
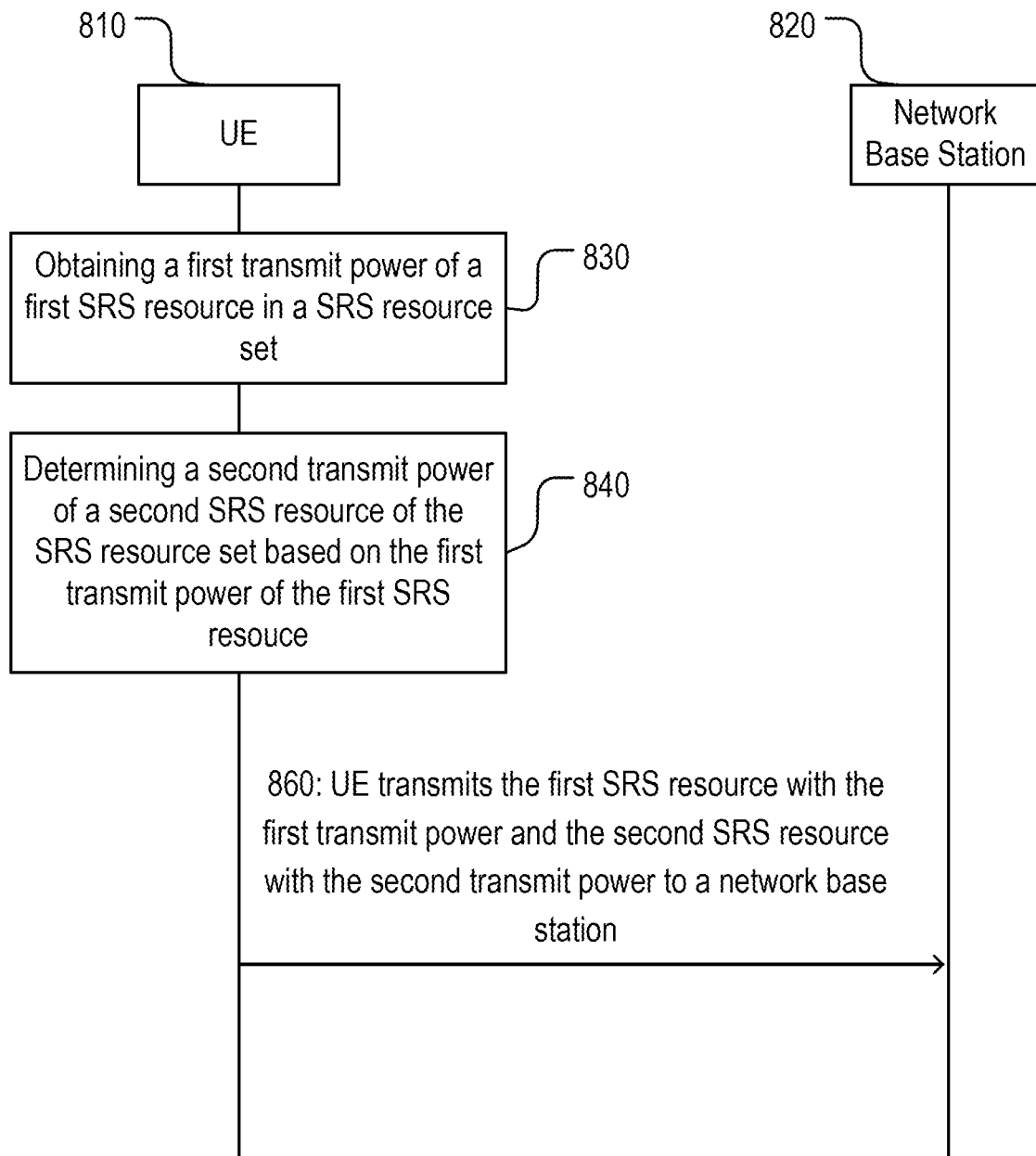
FIG. 8 shows a flow diagram of a method for wireless communication.

The present disclosure describes an embodiment to address the above drawback. Referring to FIG. 8, in step 830, a UE 810 may obtain a first transmit power of a first SRS resource of a SRS resource set. The first transmit power may be a linear value $\hat{P}$ of a determined transmit power P. In one implementation, the determined transmit power may be $P_{SRS,b,f,c}(i,q_s,l)$ on active UL bandwidth part (BWP) b of carrier f of serving cell c, wherein i is a SRS transmission occasion, $q_s$ refers to SRS resource set provided by SRS-ResourceSet and SRS-ResourceSetId, and l is an index.

In step 840, the UE may determine a second transmit power of a second SRS resource based on the first transmit power of the first SRS resource of the SRS resource set.

Referring to FIG. 9A, as one implementation of step 840, in step 910A, the UE may determine the first transmit power of the first SRS resource as $\hat{P}$; and in step 920A, the UE may determine the second transmit power of the second SRS resource as N times $\hat{P}$, wherein N is a positive integer. For example but not limited to, N may include 1, 2, 3, 4, 8, and 10. The first SRS resource may comprises a first number of ports; the second SRS resource comprises a second number of ports; and the second number is N times the first number.

Referring to FIG. 9B, as another implementation of step 840, in step 910B, the UE may determine the first transmit power of the first SRS resource as $\hat{P}$; and in step 920B, the UE may determine the second transmit power of the second SRS resource as 1/N times $\hat{P}$, wherein N is a positive integer. For example but not limited to, N may include 1, 2, 3, 4, 8, and 10. The first SRS resource may comprises a first number of ports; the second SRS resource comprises a second number of ports; and the second number is 1/N times the first number.

Referring to FIG. 9C, as another implementation, step 840 may further include step 930: allocating the first transmit power of the first SRS resource equally across the first number of ports in the first SRS resource. Referring to FIG. 9D, as another implementation, step 840 may further include step 940: allocating the second transmit power of the second SRS resource equally across the second number of ports in the second SRS resource.

Referring to FIG. 8, in step 860, the UE 810 may transmit the first SRS resource with the first transmit power and transmit the second SRS resource with the second transmit power to the network base station 820. The network base station 820 may receive the first SRS resource with the first transmit power sent by the UE and may receive the second SRS resource with the second transmit power sent by the UE.

In the embodiment described in the present disclosure, the linear value of the transmit power for the second SRS resource may be determined as N times or 1/N times of the transmit power of the first SRS resource within a same SRS resource set. The determination may depend on whether the number of SRS ports in the second SRS resource is N times or 1/N times of the number of the SRS ports in the first SRS resource.

Taking an example of 4T6R configuration as shown in FIG. 6B, N may equal to 2, and when the linear value of transmit power for a first SRS resource 660 is $\hat{P}$, the linear value of the transmit power for a second SRS resource 680 may be $\frac{1}{2}*\hat{P}(=\hat{P}/2)$, depending on that the number of ports in the second SRS resource 680 is ½ of the number of ports in the first SRS resource 660.

Taking another example of 4T6R configuration as shown in FIG. 7, N may equal to 2, and when the linear value of transmit power for a first SRS resource 720 is $\hat{P}$, the linear value of the transmit power for a second SRS resource 740 may be $2*\hat{P}$, depending on that the number of ports in the second SRS resource 740 is twice of the number of ports in the first SRS resource 720.

Embodiment #2

The present disclosure describe embodiments of methods and devices for performing sounding reference signal (SRS) transmission between a user equipment and a network base station.

For downlink and uplink between the user equipment and the network base station, channel reciprocity may be useful to measure downlink CSI based on uplink SRS transmission. In the existing methods, because of unsymmetrical interference situation between downlink and uplink, SRS precoder and/or spatial domain transmission filter may not be suitable for downlink CSI measurement. For one example, an uplink bandwidth part (BWP) used for SRS transmission from the UE to the network base station may overlap with the downlink BWP and may be narrower (or smaller) than downlink BWP. For another example, there may be no overlap between the uplink BWP used for SRS transmission and the downlink BWP. In these condition, downlink interference may be considered for calculation of the SRS precoder, which may improve downlink CSI measurement based on uplink SRS transmission.

In one embodiment, referring to FIG. 10A, a method 1000 may include step 1010: receiving, by the user equipment, N sets of parameters corresponding to a SRS resource set from a network base station.

In one embodiment, referring to FIG. 11A, a method 1100 may include step 1010: sending, by the network base station, N sets of parameters corresponding to a SRS resource set to a user equipment.

In one implementation, N may equal to 1 and there may be only one set of parameters. The set of parameters may be the same set of parameters for one or more SRS resource in the SRS resource set. For example, when the SRS resource set includes a first SRS resource and a second SRS resource. The first SRS resource and the second SRS resource may share the same set of parameters.

In another implementation, the SRS resource set may include N number of SRS resources, and the number is N>1. Each set of the N sets of parameters may correspond to each SRS resource of the SRS resource set. For example, when N=2, the SRS resource set may include a first SRS resource and a second SRS resource. The N sets of parameters corresponding to a SRS resource set may include a first set of parameters corresponding to the first SRS resource and a second set of parameters corresponding to the second SRS resource.

Referring to FIG. 10B, the method 1000 may further include step 1020: receiving, by the user equipment, each set of parameters in a beam reference configured by the network base station, wherein the beam reference comprises a transmission configuration indicator (TCI) or a spatial relation configuration.

Referring to FIG. 11B, the method 1100 may further include step 1120: configuring, by the network base station, each set of parameters in a beam reference, wherein the beam reference comprises at least one of a transmission configuration indicator (TCI) or a spatial relation configuration.

Referring to FIG. 11C, the method 1100 may further include step 1130: transmitting, by the network base station, the transmission configuration indicator (TCI) or the spatial relation configuration to the user equipment.

In another implementation, in higher frequency bands, each SRS resource may be configured with a beam reference. For one example, the higher frequency bands may include a frequency range 2 (FR2) between 24.25 GHz and 52.6 GHz. The beam reference may be used to inform quasi-co-location (QCL) information or spatial relation parameters, which may include a spatial relation (e.g., named as SRS-SpatialRelationInfo) or a TCI. The UE may transmit the SRS resource with a same spatial domain transmission filter used for the transmission or reception of the reference signal (RS) configured in the beam reference. For example, the RS may include downlink RS and/or uplink SRS. The beam reference may be used to determine analog beam forming of the SRS.

Figure 12:
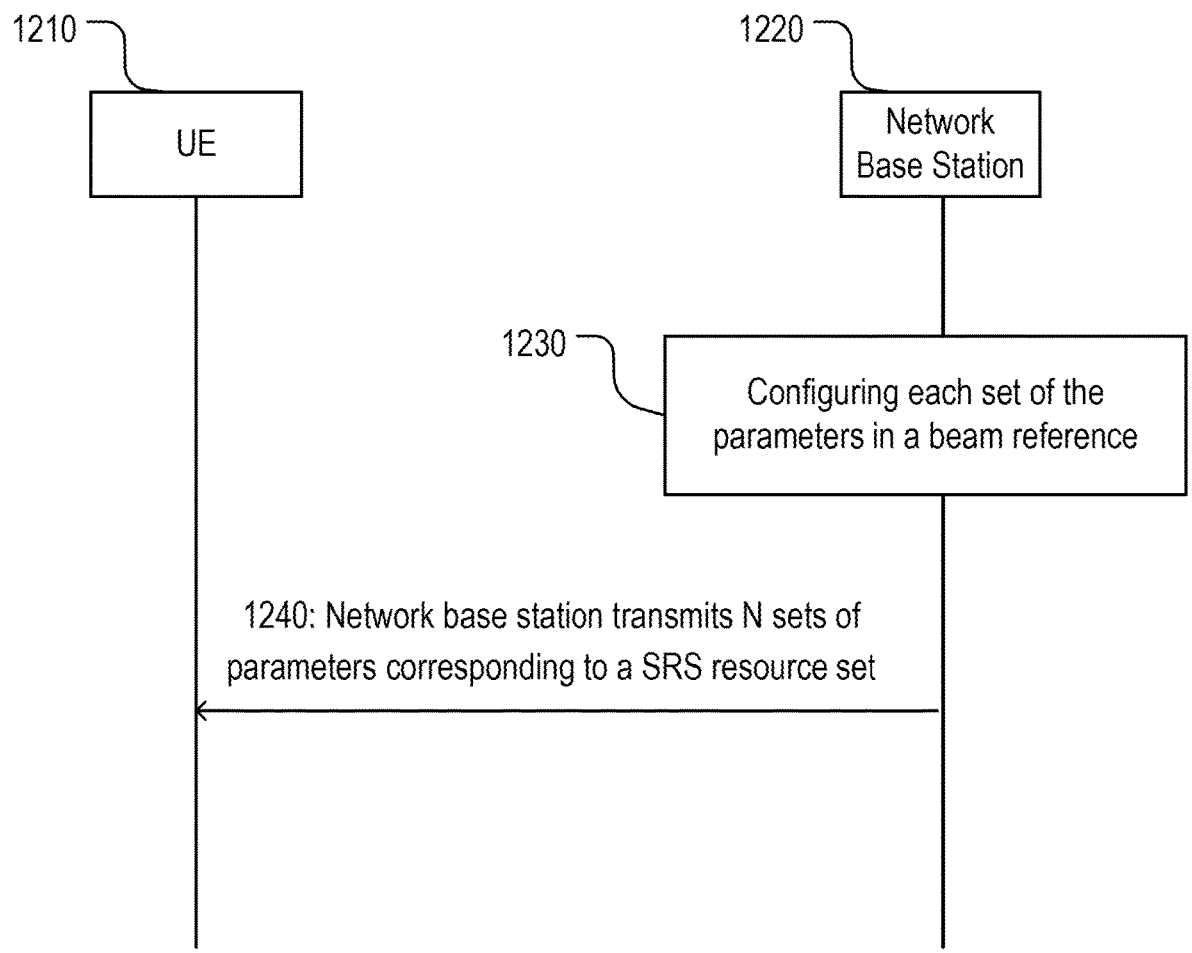
FIG. 12 shows a flow diagram of a method for wireless communication.

Referring to FIG. 12, in step 1230, a network base station 1220 may configure each set of the parameters in a beam reference. In step 1240, the network base station 1220 may transmit N sets of parameters corresponding to a SRS resource set to a UE 1210.

In one implementation, the set of parameters may be configured for intentions other than quasi co-location (QCL) information or spatial filter information. In another implementation, the set of parameters may be configured for interference estimation when SRS precoder is calculated.

The set of parameters may include additional BWP identification (ID). In one implementation, there may be an existing BWP ID configured under a beam reference, and the additional BWP ID may be independent from the existing BWP ID configured under the beam reference. The BWP ID may be used to determine downlink (DL) BWP location for interference detection. When a UE calculates SRS precoder, the UE may avoid using the precoder associated with serious interference for the DL BWP.

Additionally or alternatively, the set of parameters may include a channel state information-interference measurement (CSI-IM) resource ID (CSI-IM-ResourceId) or CSI-IM resource set ID (CSI-IM-ResourceSetID).

Additionally or alternatively, the set of parameters may include additional non-zero power (NZP) CSI-reference signal (CSI-RS) resource ID or NZP CSI-RS resource set ID. The network base station may configure a specific interference resource or resource set ID to reduce complexity of a UE. The specific interference resource or resource set ID may include CSI-IM or NZP CSI-RS resource ID or NZP CSI-RS resource set ID. When the UE calculates SRS precoder, the UE may avoid using the precoder associated with serious interference for the configured interference resource or resource set. In one implementation, there may be an existing CSI-RS ID configured under a beam reference, and the additional NZP CSI-RS resource ID may be independent from the existing CSI-RS ID configured under the beam reference.

Additionally or alternatively, the set of parameters may include a CSI-RS resource configuration ID (CSI-ResourceConfigId). The RS configured by CSI-RS resource configuration ID may indicate the specific downlink interference resource or resource set.

Additionally or alternatively, the set of parameters may include a CSI report setting ID (CSI-ReportConfigId). A csi-IM-ResourcesForInterference or a nzp-CSI-RS-ResourcesForInterference configured by CSI report setting ID may be used to indicate the specific DL interference resource or resource set. When the UE calculates SRS precoder, the UE may avoid using the precoder associated with serious interference for the interference resource or resource set.

Embodiment #3

Frequency hopping is a special transmission technique sending data (downlink and/or uplink) with changing carrier frequency in a certain pattern. To more efficiently transmit SRS between a user equipment and a network base station, the present disclosure describes embodiments of configuring SRS frequency hopping for a SRS resource or a SRS resource set.

In the existing method, at a given time slot, SRS is transmitted on one or more consecutive physical resource blocks (PRBs). SRS is uniformly distributed within the one or more consecutive PRBs. Zadoff-Chu sequences (ZC) or computer generated sequences (CGS) are used for low peak to average power ratio (PAPR). This restriction in the existing method may cause long hopping cycle even when there is no PAPR issue for a user equipment.

The present disclosure describes embodiments of methods and devices for performing sounding reference signal (SRS) transmission between a user equipment and a network base station to address at least some of the drawbacks in the existing method.

In one implementation, at a given time slot, more than one sections of frequency sounding may be supported to get quick wideband frequency sounding. The number of sections may be M, wherein M>=2. Each section of frequency sounding may include K consecutive PRBs, wherein K>=1.

Figure 13:
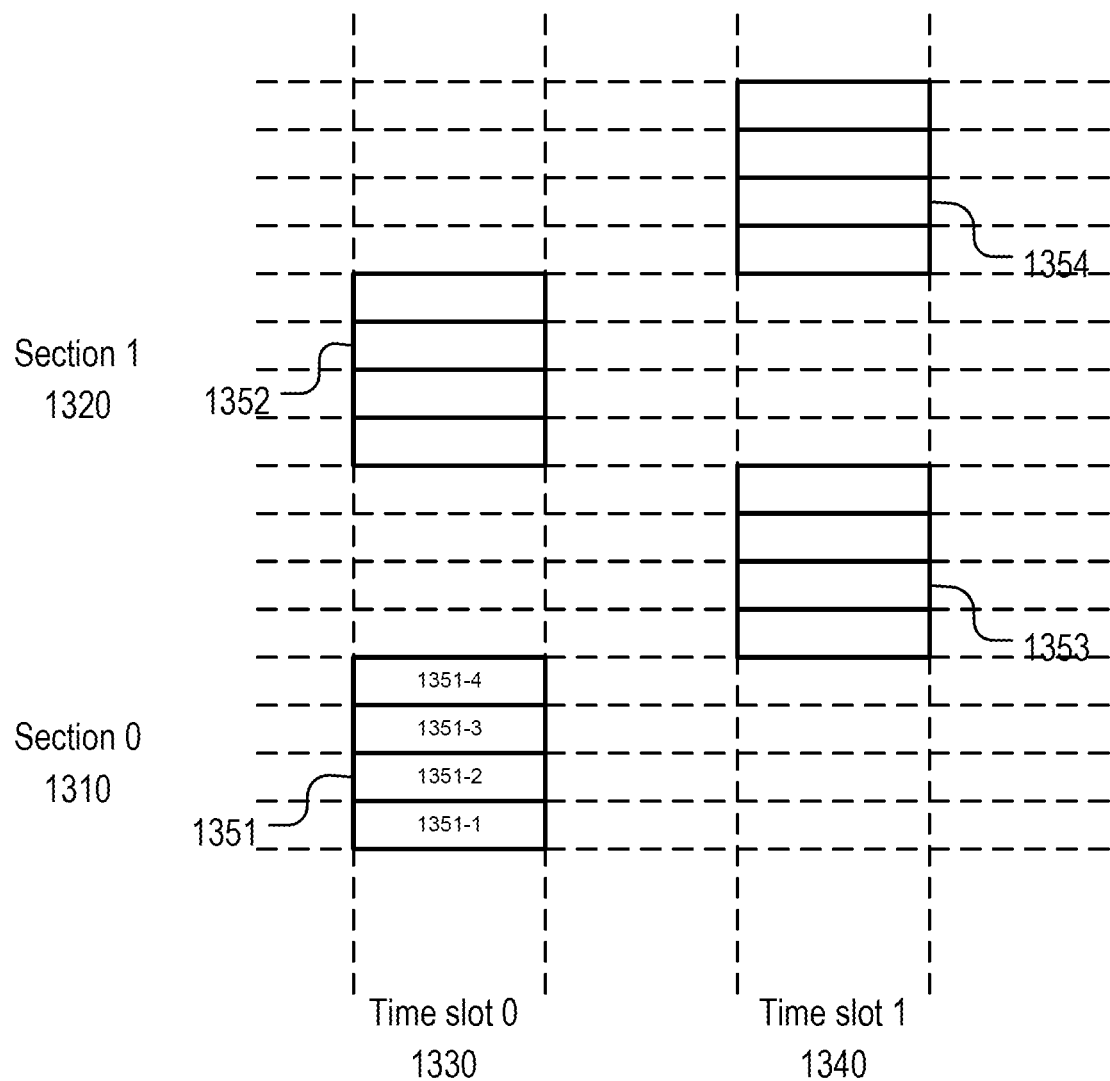
FIG. 13 shows a diagram of an example of SRS frequency hopping.

Referring to FIG. 13, for example, a first section 1310 (section 0) and a second section 1320 (section 1) of frequency sounding may be supported at a given time. In a first time slot 1330 (time slot 0), the first section 1310 may include a first hop block 1351. The first hop block 1351 may include four consecutive PRBs (1351-1, 1351-2, 1351-3, and 1351-4). In the first time slot 1330 (time slot 0), the second section 1310 may include a second hop block 1352, which may include four consecutive PRBs.

In a second time slot 1340 (time slot 1), the first section 1310 may include a third hop block 1353, which may include four consecutive PRBs. In comparison between the PRBs in the first section 1310 at the first time slot 1330 and the PRBs in the first section 1310 at the second time slot 1340, the first section 1310 of frequency sounding may frequency hop from the first hop block 1351 to the third hop block 1353.

In the second time slot 1340 (time slot 1), the second section 1320 may include a fourth hop block 1354, which may include four consecutive PRBs. In comparison between the PRBs in the second section 1320 at the first time slot 1330 and the PRBs in the second section 1320 at the second time slot 1340, the second section 1320 of frequency sounding may frequency hop from the second hop block 1352 to the fourth hop block 1354.

Referring to FIG. 13, the whole wideband frequency may be sounded within two time slots, resulting in a significant improvement of efficiency considering that the existing method may need four time slots to sound the whole wideband frequency. When M is limited, for example, M is smaller than a preset threshold, a complete ZC or CGS sequence may be maintained within each section of sounding frequency and thus PAPR degradation may be minimized or marginal.

In one embodiment, referring to FIG. 14A, a method 1400 may include step 1410: transmitting, by the user equipment, M sections of frequency sounding at a symbol to the network base station, wherein each section of the M sections comprises consecutive physical resource blocks (PRBs), M being a positive integer.

Figures 15, 16:
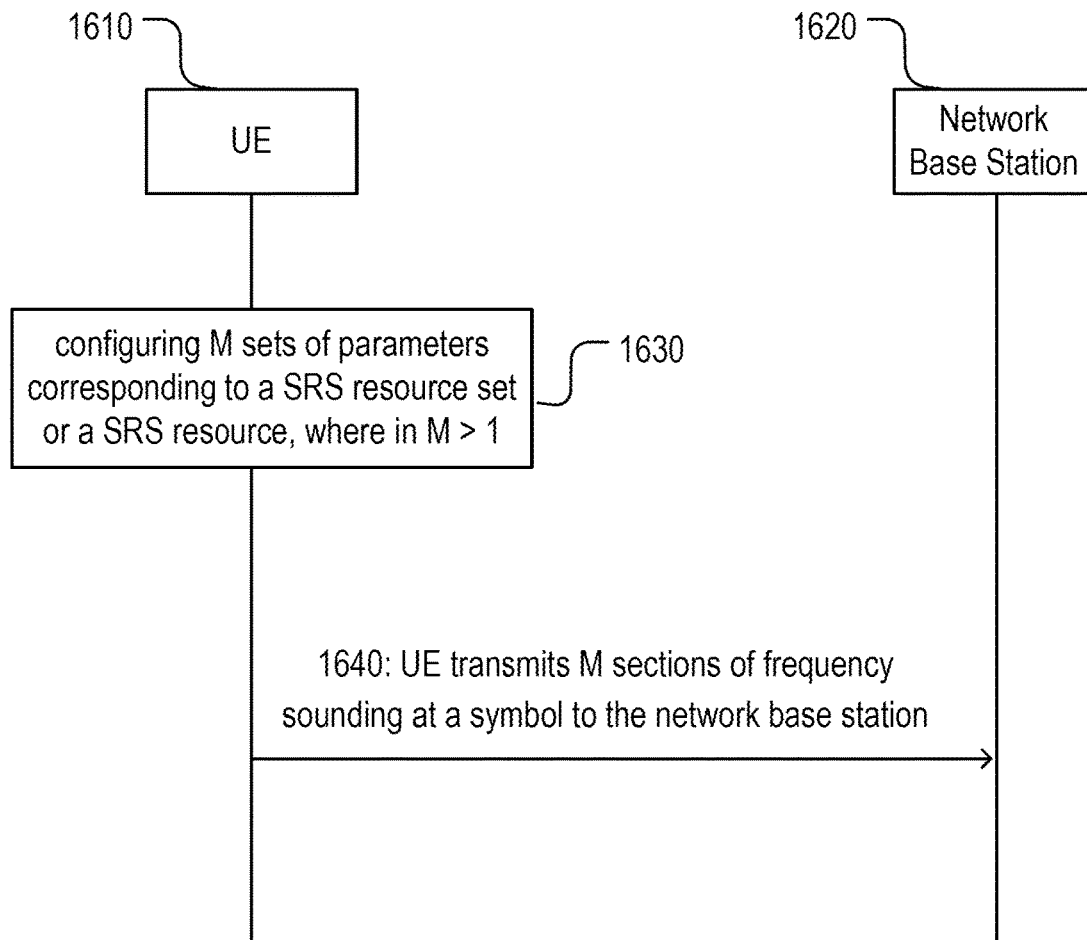
FIG. 15 shows a flow diagram of a method for wireless communication.
FIG. 16 shows a flow diagram of a method for wireless communication.

In one embodiment, referring to FIG. 15, a method 1500 may include step 1510: receiving, by the network base station, M sections of frequency sounding at a symbol from the user equipment, wherein each section of the M sections comprises consecutive physical resource blocks (PRBs), M being a positive integer.

In one implementation, referring to FIG. 14B, the method 1400 may optionally include step 1420: configuring, by the user equipment, M sets of parameters corresponding to a SRS resource set or a SRS resource, wherein M>1. Each set of the M sets of parameters may correspond to each section of the M sections of frequency sounding. Depending on their corresponding related parameters, different sections of frequency sounding may include separate hopping.

For one example, the UE may configure the M sets of parameters corresponding to a SRS resource; and configure another M sets of parameters corresponding to another SRS resource. For another example, the UE may configure the M sets of parameters corresponding to a SRS resource set; and when the SRS resource set includes a plurality of SRS resources, the plurality of SRS resources share the same set of parameters.

Referring to FIG. 16, in step 1630, a UE 1610 may configure M sets of parameters corresponding to a SRS resource set or a SRS resource, where in M>1; and in step 1640, the UE 1610 may transmit M sections of frequency sounding at a symbol to a network base station 1620.

One or each of the M sets of parameters may include all or a portion of the following parameters for frequency hopping.

The parameters may include a frequency domain position (FreqDomainPosition). The frequency domain position may be one of the higher-level parameters, specify a starting position of a SRS transmission in the frequency domain and may be named as $n_{RRC}$. For example but not limited to, the frequency domain position may include a value range between 0 and 67, inclusive.

Optionally and/or alternatively, the parameters may include a frequency domain shift (FreqDomainShift). The frequency domain shift may be one of the higher-level parameters. The FreqDomainShift may include an integer between 0 and 268, inclusive.

Optionally and/or alternatively, the parameters may include a frequency hopping (FreqHopping). The frequency hopping may be one of the higher-level parameters. The FreqHopping may include all or a portion of the following: a field of c-SRS, a field of b-SRS, or a field of b-hop.

Optionally and/or alternatively, the parameters may include a sequence identification (SequenceID) for SRS. The sequence identification may be one of the higher-level parameters.

Optionally and/or alternatively, the parameters may include a transmission comb (TransmissionComb). The TransmissionComb may be one of the higher-level parameters, and may include at least one of the following: a comb size, a comb offset, or a cyclic shift.

In another implementation, there may be other parameters configured for a SRS resource or a SRS resource set. These parameters may be shared for each of the M sections of frequency sounding.

Figure 17:
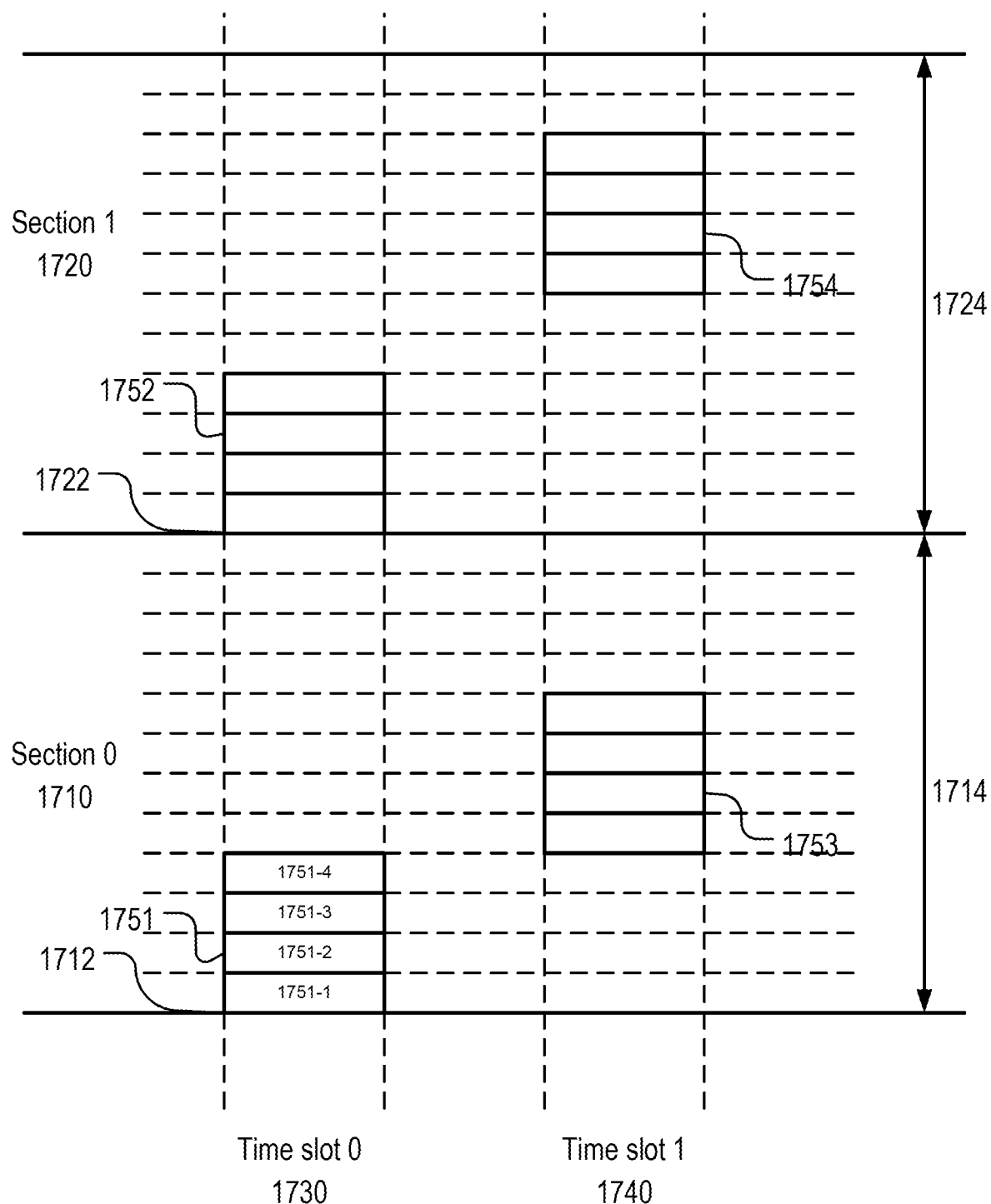
FIG. 17 shows a diagram of another example of SRS frequency hopping.

Referring to FIG. 17, in one implementation, one UE may configure two sets of SRS parameters corresponding to a first section 1710 (Section 0) and a second section 1720 (Section 1) of frequency sounding. Each of the two sets of parameters may include a frequency domain position (FreqDomainPosition). For example, the frequency domain position of the first set of parameters includes a FreqDomainPosition_0 for the first section 1710 as $n_{RRC}(0)$ 1712; and the frequency domain position of the second set of parameters includes a FreqDomainPosition_1 for the second section 1720 as $n_{RRC}(1)$ 1722.

Referring to FIG. 17, in a first time slot 1730 (Time slot 0), the first section 1710 may include a first hop block 1751. The first hop block 1751 may include four consecutive PRBs (1751-1, 1751-2, 1751-3, and 1751-4). In the first time slot 1730 (Time slot 0), the second section 1710 may include a second hop block 1752, which may include four consecutive PRBs.

In a second time slot 1740 (Time slot 1), the first section 1710 may include a third hop block 1753, which may include four consecutive PRBs. In comparison between the PRBs in the first section 1710 at the first time slot 1730 and the PRBs in the first section 1710 at the second time slot 1740, the first section 1710 of frequency sounding may frequency hop from the first hop block 1751 to the third hop block 1753.

In the second time slot 1740 (Time slot 1), the second section 1720 may include a fourth hop block 1754, which may include four consecutive PRBs. In comparison between the PRBs in the second section 1720 at the first time slot 1730 and the PRBs in the second section 1720 at the second time slot 1740, the second section 1720 of frequency sounding may frequency hop from the second hop block 1752 to the fourth hop block 1754.

In one implementation, separate hopping may be supported between different sections of frequency sounding. Referring to FIG. 17, the frequency domain position $n_{RRC}(0)$ 1712 of the first section 1710 may be different from the frequency domain position $n_{RRC}(1)$ 1722 of the second section 1720. The start hopping position subband of the first section 1710 may be different from the start hopping position subband of the second section 1720. In another implementation, there may be no overlappping between different sections of frequency sounding. In another implementation, frequency hopping $C_{SRS}$ 1714 of the first section 1710 may be the same as frequency hopping $C_{SRS}$ 1724 of the second section 1720. In another implementation, other parameters of the two sets of parameters, including a transmission comb, a cyclic shift, a number of symbols, and/or a repetition factor, may be the same for the two sections of frequency sounding.

Figures 18, 19:
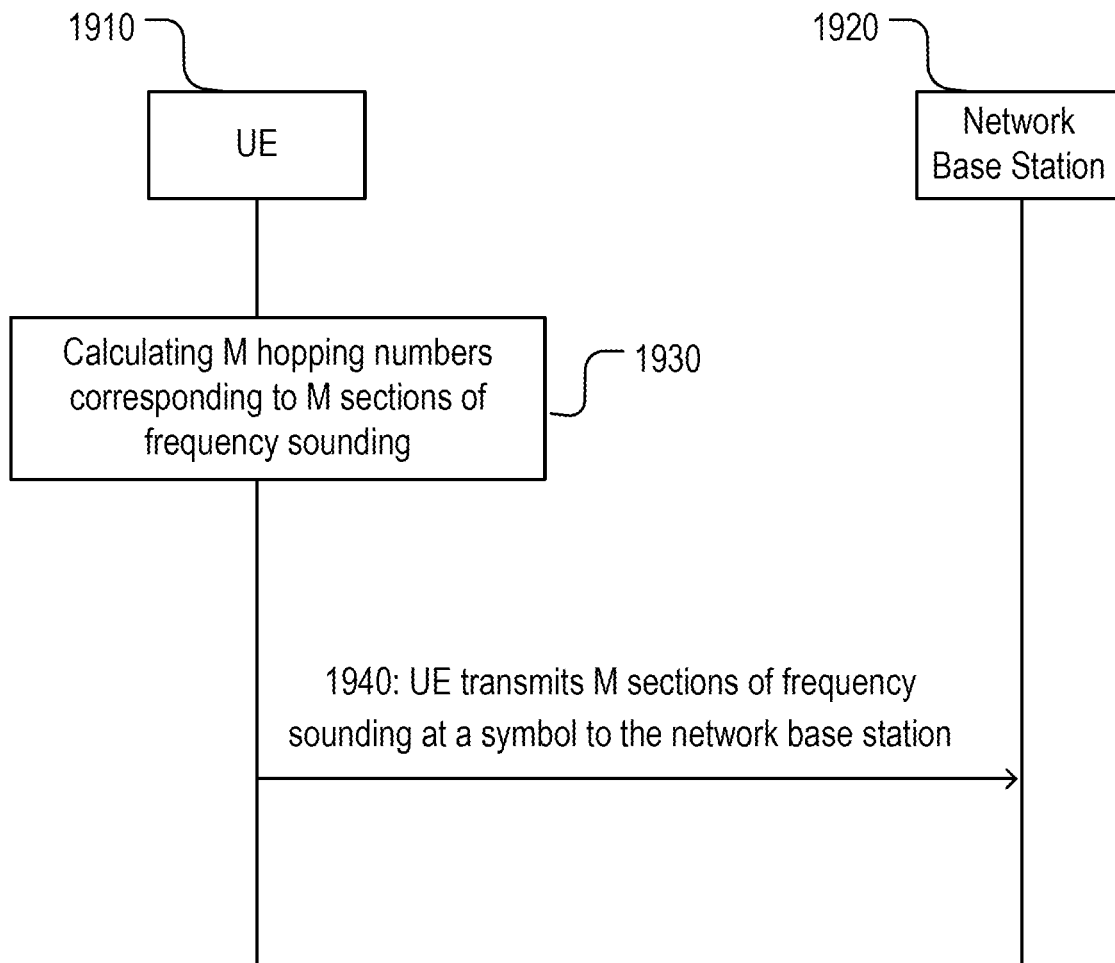
FIG. 18 shows a flow diagram of a method for wireless communication.
FIG. 19 shows a flow diagram of a method for wireless communication.

In another embodiment, the method referring to FIG. 18, the method 1400 may optionally include step 1810: calculating, by the user equipment, a set of hopping numbers corresponding to the M sections of frequency sounding. The set of hopping numbers may include M hopping numbers.

In one implementation, a single parameter (M) may be introduced for each SRS resource in a SRS resource set. Based on this single parameter (M), a UE may calculate M hopping number corresponding to the M sections of frequency sounding. In another implementation, a single parameter (M) may be introduced for a SRS resource set and the single parameter (M) may be shared among one or more SRS resources in the SRS resource set.

Referring to FIG. 19, in step 1930, a UE 1910 may calculate M hopping numbers corresponding to M sections of frequency sounding; and in step 1940, the UE 1910 may transmit M sections of frequency sounding at a symbol to a network base station 1920.

In one implementation of M=1, there may be only one frequency section. A hopping number $n_{SRS}$ may count a number of SRS transmissions. There may be one hopping number at a given symbol. For the case of an SRS resource configured as aperiodic by a higher-layer parameter (e.g., resourceType), the $n_{SRS}$ may be determined by $n_{SRS}=\lfloor l'/R \rfloor$. For the case of an SRS resource configured as periodic or semi-persistent by the higher-layer parameter resourceType, a SRS counter ($n_{SRS}$) may be determined by $$n_{SRS} = \left( \frac{N_{slot}^{frame,\mu} n_f + n_{s,f}^{\mu} - T_{offset}}{T_{SRS}} \right) \cdot \left( \frac{N_{symb}^{SRS}}{R} \right) + \left\lfloor \frac{l'}{R} \right\rfloor$$

The SRS counter ($n_{SRS}$), which may also be the hopping number when there is only one frequency section, may increase by 1 as $\lfloor l'/R \rfloor$ increases by 1 when $$\left(\frac{N_{slot}^{frame,\mu} n_f + n_{s,f}^{\mu} - T_{offset}}{T_{SRS}}\right) \cdot \left(\frac{N_{symb}^{SRS}}{R}\right)$$

remains unchanged.

In another implementation of M>1, there may be more than one frequency sections, and the corresponding hopping number may increase M as $\lfloor l'/R \rfloor$ increases by 1. A new (or updated) set of hopping numbers may be determined by $$n'_{SRS} = M \cdot n_{SRS} + \{0, 1 \ldots, M-1\}.$$

At a given symbol, the new set of hopping numbers ($n'_{SRS}$) may include $M \cdot n_{SRS}$, $M \cdot n_{SRS}+1$, ..., $M \cdot n_{SRS}+M-1$. There may be M number of hopping numbers in the new set, corresponding to M frequency sections. For example, when M=3, the new set of hopping numbers ($n'_{SRS}$) includes three hopping numbers $3n_{SRS}$, $3n_{SRS}+1$, and $3n_{SRS}+2$. The hopping number $3n_{SRS}$ may correspond to a first frequency section; the hopping number $3n_{SRS}+1$ may correspond to a second frequency section; and the hopping number $3n_{SRS}+2$ may correspond to a third frequency section. The $n_{SRS}$ may be a SRS counter and be determined by the above formula.

The present disclosure describes methods, apparatus, and computer-readable medium for wireless communication. The present disclosure addressed the issues with SRS transmission signaling between a user equipment and a base station. The methods, devices, and computer-readable medium described in the present disclosure may facilitate the performance of SRS transmission and enhance SRS signaling between a user equipment and a base station, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method for wireless communication, comprising:
performing sounding reference signal (SRS) transmission between a user equipment and a network base station by:
  obtaining, by the user equipment, a first transmit power $\hat{P}$ of a first SRS resource, wherein the first SRS resource comprises a first number of ports;
  determining, by the user equipment, a second transmit power $\hat{P}$ times a positive integer N of a second SRS resource based on the first transmit power of the first SRS resource, wherein the second SRS resource comprises a second number of ports equal to N times the first number of ports, and wherein the first SRS resource and the second SRS resource belong to a same SRS resource set;
  transmitting the first SRS resource with the first transmit power and the second SRS resource with the second transmit power; and
  receiving, by the user equipment, one or more sets of parameters of the transmitted first SRS resource and the transmitted second SRS resource in a beam reference configured by the network base station, wherein the beam reference comprises a transmission configuration indicator (TCI) or a spatial relation configuration, and wherein the one or more sets of parameters include an additional bandwidth part (BWP) identification (ID) that is independent from an existing BWP ID configured under the beam reference.

2. The method according to claim 1, further comprising:
allocating, by the user equipment, the first transmit power of the first SRS resource equally across the first number of ports; and
allocating, by the user equipment, the second transmit power of the second SRS resource equally across the second number of ports.

3. The method according to claim 1, wherein:
N equals to 2.

4. The method according to claim 1, wherein:
a capability of the user equipment comprises 4 transmit antennas and 6 receive antennas (4T6R) for antenna switching.

5. A computer program product comprising a non-transitory computer-readable program medium storing instructions, wherein, the instructions, when executed by a processor, are configured to cause the processor to implement the method according to claim 1.

6. A method for wireless communication, comprising:
performing sounding reference signal (SRS) transmission between a user equipment and a network base station by:
  receiving, by the network base station, a first SRS resource with a first transmit power $\hat{P}$ and a second SRS resource with a second transmit power $\hat{P}$ times a positive integer N from the user equipment, wherein the first SRS resource has a first number of ports and the second SRS resource has a second number of ports equal to N times the first number of ports, wherein the user equipment obtains the first transmit power of the first SRS resource and determines the second transmit power of the second SRS resource based on the first transmit power of the first SRS resource, and wherein the first SRS resource and the second SRS resource belong to a same SRS resource set; and
  configuring, by the network base station, one or more sets of parameters of the received first SRS resource and the received second SRS resource in a beam reference configured by the network base station to the user equipment, wherein the beam reference comprises a transmission configuration indicator (TCI) or a spatial relation configuration, and wherein the one or more sets of parameters include an additional bandwidth part (BWP) identification (ID) that is independent from an existing BWP ID configured under the beam reference.

7. The method according to claim 6, wherein:

the user equipment allocates the first transmit power of the first SRS resource equally across the first number of ports; and the user equipment allocates the second transmit power of the second SRS resource equally across the second number of ports.

8. The method according to claim 6, wherein:

N equals to 2.

9. The method according to claim 6, wherein:

a capability of the user equipment comprises 4 transmit antennas and 6 receive antennas (4T6R) for antenna switching.

10. An apparatus comprising:

a memory storing instructions; and a processor in communication with the memory, wherein, when the processor executes the instructions, the processor is configured to cause the apparatus to perform the method according to claim 6.

11. A computer program product comprising a non-transitory computer-readable program medium storing instructions, wherein, the instructions, when executed by a processor, are configured to cause the processor to implement the method according to claim 6.

12. An apparatus comprising:

a memory storing instructions; and a processor in communication with the memory, wherein, when the processor executes the instructions, the processor is configured to cause the apparatus to perform:

performing sounding reference signal (SRS) transmission with a network base station by:

obtaining a first transmit power $P$ of a first SRS resource, wherein the first SRS resource comprises a first number of ports;

determining a second transmit power $\hat{P}$ times a positive integer N of a second SRS resource based on the first transmit power of the first SRS resource, wherein the second SRS resource comprises a second number of ports equal to N times the first number of ports, and wherein the first SRS resource and the second SRS resource belong to a same SRS resource set; and receiving sets of parameters of the first SRS resource and the second SRS resource in a beam reference configured by the network base station, wherein the beam reference comprises a transmission configuration indicator (TCI) or a spatial relation configuration, and wherein the one or more sets of parameters include an additional bandwidth part (BWP) identification (ID) that is independent from an existing BWP ID configured under the beam reference.

* * * * *